SIGNAL RESPONSIVE CIRCUIT

Filed June 28, 1952

INVENTORS
HORATIO N. CROOKS,
LINDER C. HOBBS &
BRUNO A. KAELIN, JR.
BY
ATTORNEY

United States Patent Office 2,785,305
Patented Mar. 12, 1957

2,785,305

SIGNAL RESPONSIVE CIRCUIT

Horatio N. Crooks and Linder C. Hobbs, Haddonfield, and Bruno A. Kaelin, Jr., Gloucester, N. J., assignors to Radio Corporation of America, a corporation of Delaware Application June 28, 1952, Serial No. 296,154

7 Claims. (Cl. 250—27)

This invention relates to information handling devices and computers; and particularly to an electronic signal responsive circuit having utility therein.

Gating and buffer circuits used in the digital computer art have been given a nomenclature which relates to the logical function performed by the circuit. A gate is sometimes called a logical "and" circuit, and a buffer is called a logical "or" circuit. These circuits are described in "High-Speed Computing Devices" by Engineering Research Associates, McGraw-Hill, 1950, chapter 4. One form of logical circuit is that in which the function "either but not both" is produced; that is to say an output pulse is produced if a signal pulse is applied to either one or the other of two inputs but not if a pulse is applied to both inputs. This type of circuit is of general utility in the digital computer art as a switching circuit. It may also be used to determine if two bits or binary digits of binary information are represented by an odd or even number of pulses; and a plurality of such circuits may be combined to perform a parity check.

In the prior art, the operation of "either but not both" generally required a plurality of circuits which were responsive to different signal combinations, and which were combined to produce the desired result. Such circuits are described in "High-Speed Computing Devices," supra, chapter 13. In a typical example, the desired function is produced indirectly by a plurality of circuits. One of the circuits produces an output pulse when either or both of two inputs receive pulses (an "or" circuit), and another circuit produces an output only when both inputs receive pulses simultaneously (an "and" circuit). The circuits are coupled to neutralize any simultaneous output therefrom when both inputs are pulsed simultaneously, but to produce an output pulse when one or the other input is pulsed. It is apparent that it is desirable to provide an improved and simple circuit which has the inherent function of "either but not both" and which functions in that manner directly and economically.

Accordingly, it is an object of this invention to provide a new and improved signal responsive circuit of the type producing an output signal when a signal is present at either of two inputs but not present at both simultaneously.

Another object of this invention is to provide a simpler signal responsive circuit which is economical and reliable.

Still another object of this invention is to provide a simple electronic circuit having two inputs, that transmits signals received by either input, and that neutralizes signals received simultaneously.

These and other objects of this invention are achieved by coupling a pair of electron discharge tubes to opposite ends of the primary coil of a transformer, a pair of electron control devices to opposite ends of the secondary coil of the transformer, the center tap of which is grounded, and a common output terminal to both of the control devices. The transformer translates signals produced by either of the electron discharge tubes, and permits signals produced simultaneously by both to be neutralized.

The organization and method of operation of the invention may be best understood from the following description and the accompanying drawings in which.

Figure 1:
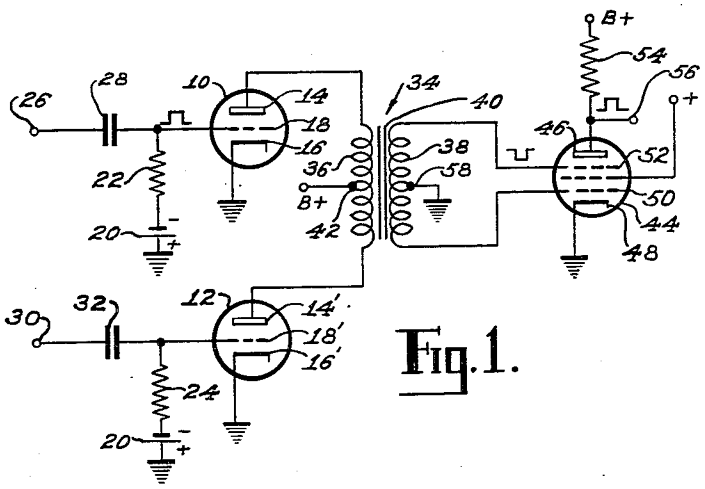
Figure 1 shows a schematic circuit diagram of an embodiment of the invention.

Referring to Figure 1, a first input tube 10 and a second input tube 12 are provided. Each tube has an anode, 14, 14', a cathode 16, 16' and a control grid 18, 18'. The control grids 18 and 18' of the first and second tubes 10 and 12 are connected to a negative bias source 20 through biasing resistors 22 and 24. A first input terminal 26 is coupled to the grid 18 of the first tube 10 through a coupling capacitor 28; and similarly, a second input terminal 30 is coupled through a capacitor 32 to the grid of the second tube 12. A transformer 34 having a primary coil 36, a secondary coil 38 and a core 40 is coupled to the input tubes 10 and 12 the opposite ends of the primary coil 36 of the transformer being connected to the anodes 14, 14' of the tubes. A source of operating potential is connected to the primary coil 36 at a center tap 42. The secondary coil 38 of the transformer is coupled to an output tube 44. The output tube 44 has an anode 46, a cathode 48 and first and second control grids 50 and 52. The grids 50 and 52 are connected to opposite ends of the transformer secondary 38. The anode 46 of the output tube 44 is connected to a source of operating potential through a load resistor 54 and also to an output terminal 56. The cathode 48 of the tube 44 is connected to ground, as is the transformer secondary 38 through a center tap 58. The input terminals 26 and 30 may be connected to any suitable source of voltage pulses such as a pulse gating circuit.

The circuit operates with the input tubes 10 and 12 normally cut off and the output tube 44 conducting. A positive pulse applied to the first tube 10 causes the tube to conduct and current flows in the portion of the transformer primary connected to that tube 10. The resulting voltage induced in the secondary produces a negative pulse on the second control grid 52 of the output tube. Similarly, when a positive pulse is applied to the second input tube 12, a negative pulse is produced at the first control grid 50 of the output tube 44. A negative pulse on either of the control grids 50 or 52 of the output tube 44 cuts that tube off and produces a positive output pulse across the load resistance 54. If pulses are applied simultaneously to both of the input terminals 26 and 30, the magnetic flux produced in the core 40 of the transformer 34 by the current in one half of the transformer primary 36 is of opposite polarity to, and thus neutralizes, that produced by the other half. There is no net change in the flux linking the primary 36 and the secondary 38, and no pulses are applied to the control grids 50 and 52 of the output tube 44. Thus, no output pulses are produced at the output 56 if both input tubes 10 and 12 are pulsed simultaneously. It is apparent that in the absence of an input pulse there is no output pulse.

Figure 2:
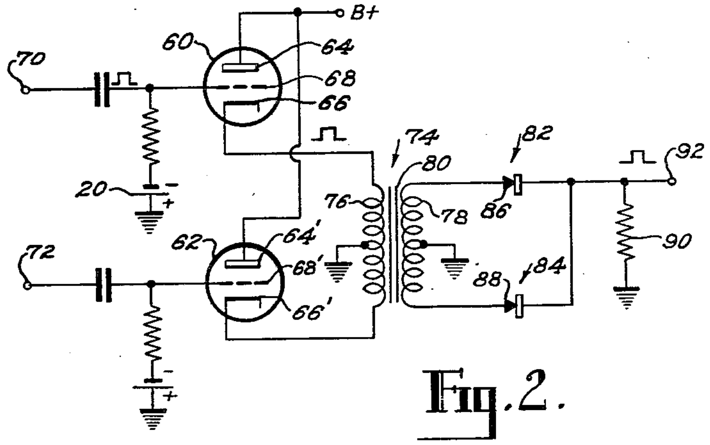
Figure 2 shows a schematic circuit diagram of another embodiment of the invention.

The circuit shown in Figure 2 is similar to that shown in Figure 1. Referring to the circuit shown in Figure 2, a first and a second input tube 60 and 62 are provided, each having an anode 64, 64', a cathode 66, 66' and a control grid 68, 68'. The control grid 68 of the first tube 60 is biased to cut off potential, and is capacitor-coupled to a first input terminal 70. The grid 68' of the second tube 62 is also biased to cut off and is capacitor-coupled to a second terminal 72. A transformer 74 having a primary coil 76, a secondary coil 78 and a core 80 is coupled to the input tubes 60 and 62; the opposite ends of the primary coil 76 being connected to the cathodes 66 and 66′ of the tubes 60 and 62. The anodes 64, 64′ of the tubes are connected to a source of operating potential. A first and a second diode 82 and 84 are coupled to the secondary coil 78 of the transformer 74; the anode 86 of the first diode 82 is coupled to one end of the coil 78, and the anode 88 of the other diode 84 to the other end. It will be apparent that the diodes 82 and 84 may be reversed and the cathodes coupled to the secondary coil to give an opposite polarity output pulse. The cathodes of both diodes 82 and 84 are connected through a common load resistor 90 to ground, and also to an output terminal 92.

If a pulse is applied to either one of the input tubes 60 or 62, the tube conducts, and the resulting current through a portion of the transformer primary 76 induces a voltage in the transformer secondary 78. This voltage may be considered as a positive pulse at one end of the transformer secondary 78 and a negative pulse at the other end. The diodes 82 and 84 are oriented to pass only the positive pulse which produces a positive output pulse at the output terminal 92. On the other hand, if both input tubes 60 and 62 are pulsed simultaneously, the currents in the two portions of the transformer primary 76 produce opposing polarities of flux in the core 74 of the transformer. The flux in the core is cancelled, and there is no change in the secondary 78. Thus, an output pulse is produced if either input tube receives a pulse, but not if both are pulsed.

Figure 3:
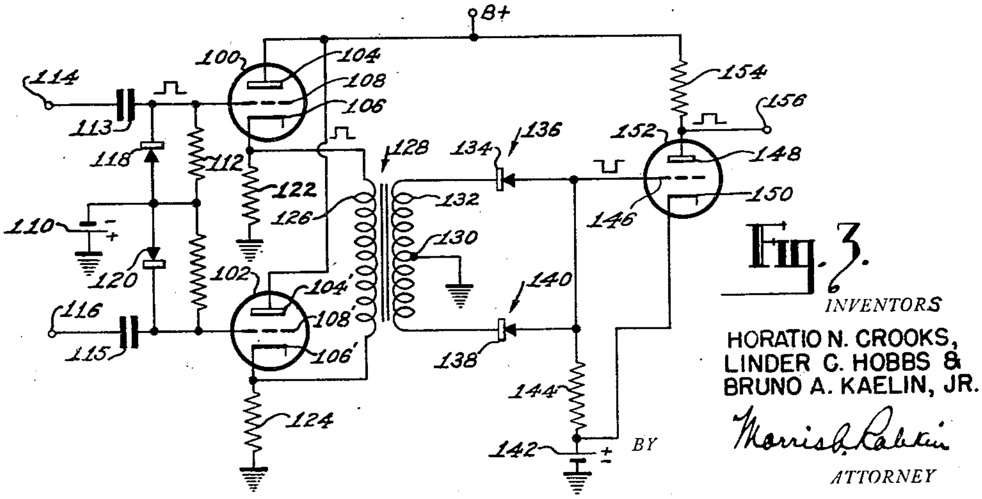
Figure 3 shows a schematic circuit diagram of still another embodiment of the invention.

In the circuit shown in Figure 3, a first and a second input tube 100 and 102, each having an anode 104, 104′, a cathode 106, 106′ and a control grid 108, 108′, are provided as before. The control grid 108 of the first tube 100 is connected to a negative bias source 110 through a biasing resistor 112 and also coupled through a capacitor 113 to a first input terminal 114. The grid 108′ of the second tube 102 is also negatively biased and coupled through a capacitor 115 to a second input terminal 116. Diodes 118 and 120 are connected between the biasing source 110 and control grids of both tubes 100 and 102. The anode 104, 104′ of each tube 100, 102 is connected to a source of operating potential, and the cathode 106, 106′ of each tube 100, 102 is connected to ground through a cathode resistor 122, 124. The cathodes 106 and 106′ are also connected to the opposite ends of the primary coil 126 of a transformer 128. A center tap 130 on the secondary coil 132 of the transformer 128 is connected to ground; and one end of the coil 132 is connected to the cathode 134 of a first diode 136 and the other end to the cathode 138 of a second diode 140. The anodes of both diodes 136 and 140 are connected to a positive biasing source 142 through a biasing resistor 144, and are also connected to the control grid 146 of an output tube 152. The grid 146 of the output tube 152 is also connected to the positive biasing source 142 through the biasing resistor 144, and the cathode 150 is connected to the same biasing source 142. The anode 148 of the output tube 152 is connected to a source of operating potential through a load resistor 154 and also to an output terminal 156.

In the quiescent state, the first and second input tubes 100 and 102 are biased to cut off and the output tube 152 is conducting. A positive pulse applied to the first input tube 100 causes its cathode to rise which produces a current in the primary coil 126 through a path provided by the cathode resistor 124 of the other tube 102. This current in turn induces a negative voltage at one end of the secondary coil 132 and a positive pulse at the other end. One of the diodes 136, 140 passes the negative pulse and applies it to the grid 146 of the output tube 152; the positive pulse is blocked by the other diode. The negative pulse cuts off the output tube 152 producing a positive pulse at the output terminal 156. Similarly, a positive output pulse is produced at the output terminal 156 if a positive pulse is applied to the second input tube 102 with the functions of diodes 136, 140 being reversed. The function of the output tube 152 is amplification and inversion of the output pulse, and also isolation of the transformer secondary and the diodes from any succeeding circuit. If a pulse is applied to both of the input tubes 100 and 102, the cathodes of both tubes rise so that there is no potential difference across the primary 126 of the transformer. Thus, there is no change in the secondary coil 132, no pulse applied to the grid 146 of the output tube 152, and no output is provided at the output terminal 156. The output diodes 136 and 140 are biased positively so that they are maintained conducting. This provides a low resistance damping path across the secondary 132 of the transformer 128. The diodes 118 and 120 connected to the control grids of the input tubes 100 and 102 are used for D. C. restoration insuring that the bias on the input tubes is independent of pulse repetition frequency.

Although it is not intended to limit the invention to any specific circuit parameters, the following components have been found suitable for an arrangement in accordance with the embodiment shown in Figure 3:

| | | |
|---|---|---|
| Tubes 100, 102, 152 | ½ of 12AU7 | |
| Diodes 118, 120, 136, 140 | IN34A | |
| Transformer 128 | Utah 9280 | |
| Condensers 113, 115 | microfarads | .0082 |
| Resistors 112 | ohms | 100,000 |
| Resistors 122, 124 | do | 330 |
| Resistor 144 | do | 1,000 |
| Resistor 154 | do | 22,000 |
| Source B+ | volts | 180 |
| Source 110 | do | 10 |
| Source 142 | do | 4 |

A circuit embodying this invention may be used in an error detecting system for digital computers. As described in the patent to Hamming et al., Patent No. 2,552,629, granted May 15, 1951, in one such system each binary character or code group is made up of a specific number of elements or bits (each of which is one or the other of the binary digits, 0 and 1), and added thereto are one or more checking elements. The added checking element may be a 0 or 1 to make the total number of 1's in each character even or odd according to a predetermined convention. Each character may then be checked periodically or continuously during the various computer operations, and if the number of 1's is not even or odd according to convention, an error is known to exist. This system of coding is known as a "parity code."

A "parity code checker" may be used to ascertain whether the number of 1's (as represented say by positive pulses) present in a binary character is odd or even. A circuit having the function "either but not both" such as described above, produces an output pulse if two parallel elements of a binary character have an odd number of 1's, i. e. a 1 and a 0; but there is no output pulse if there is an even number of 1's, i. e. two 1's or zero 1's. A character having any number of binary digits or bits may be checked for parity by a suitable coupling of a plurality of such circuits. For example, to check a four-bit character, two circuits are connected in parallel with each of the four inputs corresponding to one of the bits. The two outputs of these circuits are used as the inputs of another "either but not both" circuit constituting the succeeding stage of the parity checker. A pulse or the absence of a pulse from the output of this stage of the parity checker represent respectively an odd or even number of 1's in the four-bit character.

In summary, a transformer is used to provide a signal responsive circuit in which a pulse is produced at an output if a signal pulse is applied to one or the other of two inputs but not if pulses are applied to both inputs. The ends of the primary coil of the transformer are connected to electron discharge tubes operating as inputs, and the secondary coil has its ends connected to two electron control devices functioning as buffers. A common output terminal is coupled to both of the electron control devices.

It is, therefore, evident that the circuits embodying this invention directly produce the function of "either but not both." It is economical in construction and has considerable utility.

What is claimed is:

1. An electronic circuit comprising a pair of electron discharge tubes each having an input and an output electrode, means for selectively applying input pulses of the same polarity to said input electrodes, a transformer having a primary and a secondary coil, said output electrodes being coupled to opposite ends of said primary coil, a pair of electron control devices, said control devices being coupled to opposite ends of said secondary coil, reference potential means coupled to said secondary coil and to said control devices, and a common output terminal coupled symmetrically to both said control devices and to said reference potential means to receive an output pulse with respect to said reference potential means if either of said tubes receives an input pulse but not if both receive pulses simultaneous.

2. An electronic circuit comprising a pair of electron discharge tubes, each said tube having an anode, a cathode and a control grid, a cathode impedance coupled to the cathode of each of said tubes, means for applying a voltage across each of said tubes and the cathode impedance thereof, a transformer having a primary and a secondary coil, means coupling said primary coil between said cathodes, and output means coupled to said secondary coil including a pair of electron control devices coupled to opposite ends of said secondary coil, and a common output terminal coupled to both said devices.

3. An electronic circuit as recited in claim 2, wherein each of said control devices comprises a diode having a cathode electrode and an anode electrode, both electrodes of one type being coupled to said secondary coil, and both electrodes of the other type being coupled to said output terminal.

4. An electronic circuit as recited in claim 3, wherein each of said control devices is biased for conduction.

5. An electronic circuit as recited in claim 2, wherein said output means includes an additional electron discharge tube having an anode, a cathode and a control grid, and each of said control devices comprises a diode having a cathode and an anode, both of said cathodes being coupled to said secondary coil, both of said anodes being coupled to the control grid of said additional tube, said output terminal being coupled to the anode of said additional tube.

6. An electronic circuit comprising a pair of electron discharge tubes each having an input and output electrode, means for applying input pulses of the same polarity to said input electrodes, a transformer having a primary and a secondary coil, said output electrodes being coupled to opposite ends of said primary coil, another electron discharge tube having a pair of control electrodes respectively coupled to opposite ends of said secondary coil, and an output terminal coupled to another electrode of said another tube.

7. An electronic circuit comprising a pair of electron discharge tubes each having an input and an output electrode, means for applying input pulses of the same polarity to said input electrodes, a transformer having a primary and a secondary coil, said output electrodes being coupled to opposite ends of said primary coil, a pair of electron control devices each including a diode having a cathode electrode and an anode electrode, both of said diode electrodes of one type being respectively coupled to opposite ends of said secondary coil, and a common output terminal coupled to both of said diode electrodes of the other type.

References Cited in the file of this patent

UNITED STATES PATENTS

| | | |
|---|---|---|
| 1,428,156 | Espenschied | Sept. 5, 1922 |
| 1,765,606 | Ohl | June 24, 1930 |
| 2,027,919 | Lindenblad | Jan. 14, 1936 |
| 2,469,598 | Harris | May 10, 1949 |
| 2,577,015 | Johnson | Dec. 4, 1951 |